United States Patent [19]
Tanaka et al.

[11] Patent Number: 5,212,642
[45] Date of Patent: May 18, 1993

[54] ELECTRIC CONTROL APPARATUS FOR FOUR-WHEEL STEERING SYSTEM

[75] Inventors: Hiroaki Tanaka, Toyota; Osamu Takeda, Susono; Kaoru Ohashi, Okazaki; Mizuho Sugiyama; Shin Koike, both of Toyota; Hitoshi Iwata, Okazaki; Masaru Ishikawa, Susono; Hideki Kusunoki, Toyota, all of Japan

[73] Assignee: Toyota Jidosha Kabushiki Kaisha, Toyota, Japan

[21] Appl. No.: 733,022

[22] Filed: Jul. 22, 1991

[30] Foreign Application Priority Data

Jul. 20, 1990 [JP] Japan .................................. 2-193393

[51] Int. Cl.$^5$ .............................................. B62D 5/04
[52] U.S. Cl. .................. 364/424.05; 280/91; 180/140; 180/142; 180/79.1
[58] Field of Search ...................... 364/424.05; 280/91; 180/79.1, 140–143

[56] References Cited

U.S. PATENT DOCUMENTS

| | | | |
|---|---|---|---|
| 4,574,905 | 3/1986 | Asano et al. | 180/142 |
| 4,625,822 | 12/1986 | Nakamura et al. | 180/142 |
| 4,732,231 | 3/1988 | Kanazawa et al. | 180/140 |
| 4,852,897 | 8/1989 | Takatani et al. | 280/91 |
| 4,949,261 | 8/1990 | Ito et al. | 180/140 |
| 4,971,175 | 11/1990 | Hamada et al. | 180/140 |
| 5,099,940 | 3/1992 | Imaseki et al. | 364/424.05 |
| 5,103,925 | 4/1992 | Imaseki et al. | 364/424.05 |

FOREIGN PATENT DOCUMENTS

| | | |
|---|---|---|
| 0280207 | 8/1988 | European Pat. Off. . |
| 0316932 | 5/1989 | European Pat. Off. . |
| 3814059 | 12/1988 | Fed. Rep. of Germany . |
| 59-81267 | 5/1984 | Japan . |

Primary Examiner—Gary Chin
Attorney, Agent, or Firm—Cushman, Darby & Cushman

[57] ABSTRACT

An electric control apparatus for a four-wheel steering system is designed to calculate a rear wheel steering angle on a basis of a control rule corresponding with a steering mode selected from a plurality of rear wheel steering modes thereby to steer a set of dirigible rear road wheels at the calculated steering angle. The electric control apparatus is further designed to calculate a difference between new and old steering angles calculated when the selected steering mode has been changed to another one of the steering modes and immediately after change of the selected steering mode, to gradually decreasing an absolute value of the calculated difference at a predetermined time interval, to correct the new steering angle in accordance with the absolute value of the calculated difference until the absolute value becomes zero after change of the selected steering mode and to control an actual steering angle of the rear road wheels in accordance with the corrected new steering angle.

1 Claim, 8 Drawing Sheets

ELECTRIC CONTROL APPARATUS FOR FOUR-WHEEL STEERING SYSTEM

BACKGROUND OF THE INVENTION

1. Field of the Invention

The present invention relates to a four-wheel steering system in automotive vehicles, and more particularly to an electric control apparatus for the four-wheel steering system for controlling an actual steering angle of the rear road wheels in accordance with a steering mode selected by the driver and/or conditions of sensors detecting control factors for the rear road wheels.

2. Description of the Prior Art

In Japanese Patent Early Publication No. 59-81267, there has been proposed an electric control apparatus for a rear wheel steering mechanism in a four-wheel steering system, which is designed to calculate a steering angle of the rear road wheels on a basis of a control rule corresponding with a steering modes selected from a plurality of rear wheel steering modes thereby to steer the rear road wheels at the calculated steering angle. The electric control apparatus is further designed to delay operation speed of the rear wheel steering mechanism when the steering mode has been changed to another one of the steering modes thereby to moderate sudden change of the rear wheel steering angle for eliminating deterioration of stability of the vehicle in steering operation.

In the electric control apparatus, however, the actual steering angle of the rear road wheels may not correspond with the calculated steering angle when the latter steering angle has suddenly changed after change of the selected steering mode as shown by a chain line in FIG. 9. In this instance, the actual steering angle of the rear road wheels is varied as shown by a dotted line in FIG. 9. For this reason, the steering function of the rear road wheels at the newly selected mode may not be effected. As a result, stability of the vehicle in steering operation may not be obtained, and the driver feels incompatibility in his steering operation.

SUMMARY OF THE INVENTION

It is, therefore, a primary object of the present invention to provide an improved electric control apparatus for the four-wheel steering system capable of moderating sudden change of the actual rear wheel steering angle caused by change of the steering mode and of fully effecting the steering function of the rear road wheels at the newly selected mode.

According to the present invention, the primary object is accomplished by providing an electric control apparatus for a four-wheel steering system which comprises mode selection means for selecting any one of a plurality of rear wheel steering modes, memory means for memorizing a plurality of control rules respectively corresponding with the rear wheel steering modes, calculation means for calculating a rear wheel steering angle on a basis of the memorized control rule corresponding with the selected rear wheel steering mode, and an electrically operated rear wheel steering mechanism for steering a set of rear road wheels at the calculated steering angle, wherein the electric control apparatus further comprises first means for calculating a difference between new and old steering angles calculated by the calculation means when the selected rear wheel steering mode has been changed to another one of the steering modes and immediately before change of the selected rear wheel steering mode, second means for gradually decreasing an absolute value of the calculated difference at a predetermined time interval, and third means for correcting the new steering angle in accordance with the absolute value of the calculated difference until the absolute value becomes zero after change of the selected rear wheel steering mode and for controlling an actual steering angle of the rear road wheels in accordance with the corrected new steering angle.

BRIEF DESCRIPTION OF THE DRAWINGS

Additional objects, features and advantages of the present invention will be more readily appreciated from the following detailed description of a preferred embodiment thereof when taken together with the accompanying drawings. in which.

DESCRIPTION OF THE PREFERRED EMBODIMENT

Figure 1:
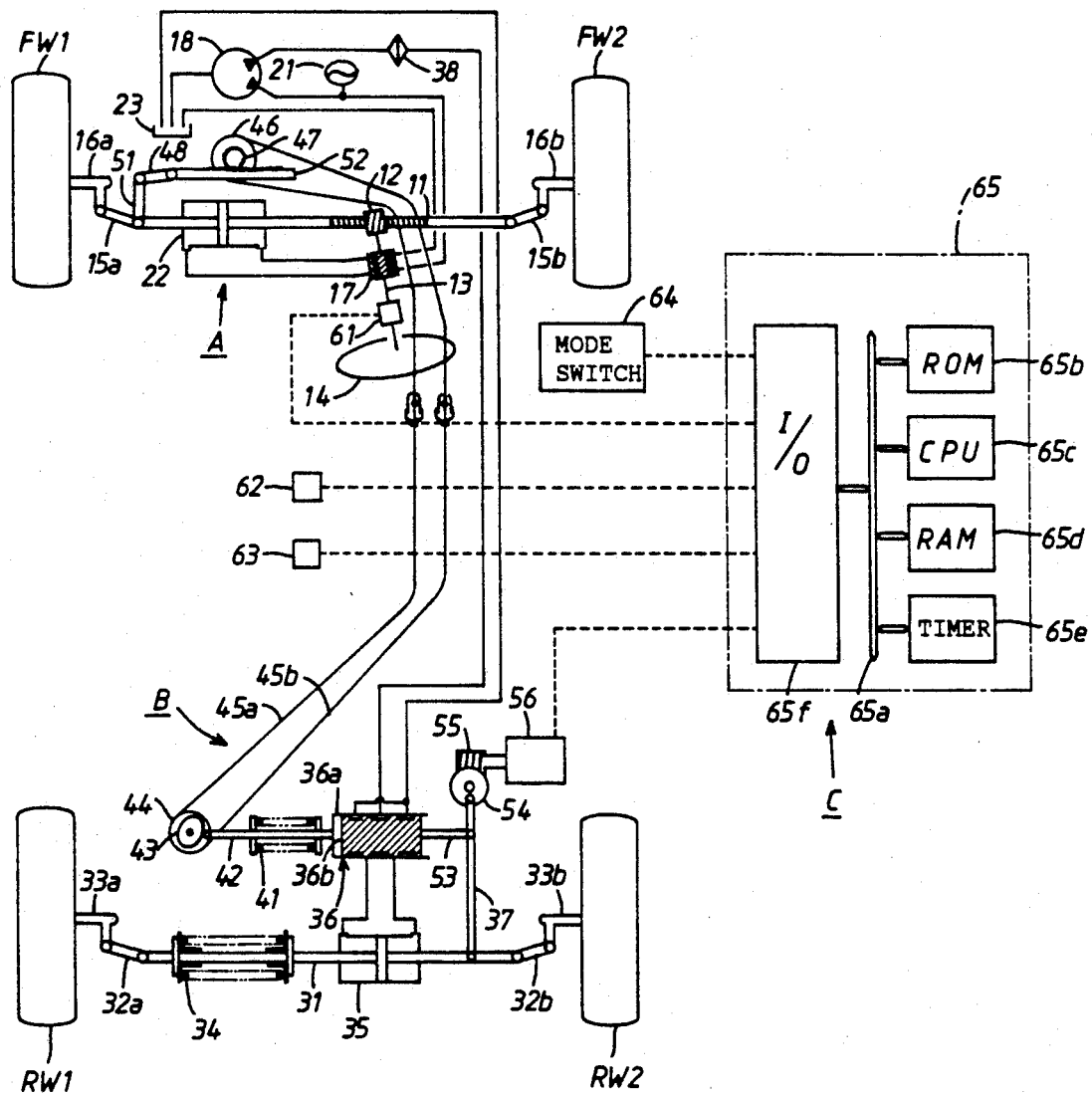
FIG. 1 is a schematic illustration of an electric control apparatus for a four-wheel steering system in an automotive vehicle.

In FIG. 1 of the drawings, there is schematically illustrated a four-wheel steering system in an automotive vehicle which comprises power-assisted front and rear wheel steering mechanisms A and B. The front wheel steering mechanism A includes a lateral rack bar 11 arranged to be axially displaced by operation of a steering wheel 14, a pair of tie rods 15a, 15b connected to opposite ends of rack bar 11 and a pair of knuckle arms 16a, 16b each connected to the tie rods 15a, 15b to steer a pair of dirigible front road wheels FW1, FW2 in response to axial displacement of the rack bar 11. The steering wheel 14 is operatively connected to the rack bar 11 by means of a pinion 12 and a steering shaft 13. The steering shaft 13 has a direction control valve 17 provided thereon to selectively supply fluid under pressure from a hydraulic tandem pump 18 into opposite chambers of a power cylinder 22 in accordance with a steering effort applied to the steering wheel 14. The power cylinder 22 is mounted on a vehicle body structure to assist axial displacement of the rack bar 11 in accordance with the fluid under pressure supplied thereto.

The rear wheel steering mechanism B includes a lateral operation rod 31 arranged to be axially displaced, a pair of tie rods 32a, 32b connected to opposite ends of the operation rod 31 and a pair of knuckle arms 33a, 33b each connected to the tie rods 32a, 32b to steer a pair of dirigible rear road wheels RW1, RW2 in response to axial displacement of the operation rod 31. The operation rod 31 is loaded by a spring 34 to be retained in a neutral position and is assisted by operation of a power cylinder 35 assembled thereon. The power cylinder 35 is supplied with the fluid under pressure from the tandem pump 18 through a filter 38 under control of a spool valve 63 which is associated with a swingable lever 37 to provide a hydromechanical tracer mechanism. The spool valve 36 includes a valve sleeve 36a axially movably mounted on the vehicle body structure and a valve spool 36b disposed within the valve sleeve 36a for relative movement therewith. The valve sleeve 36a is connected to a drive rod 42 which is loaded by a spring 41 to be retained in a neutral position. The drive rod 42 is maintained in engagement with a cam member 43 which is secured to a pulley 44 for rotation therewith.

The pulley 44 is rotatably mounted on the vehicle body structure to be rotated by a pair of cables 45a, 45b connected thereto. The cables 45a, 45b are extended forwardly and connected at their front ends to a pulley 46 to rotate the cam member 43 with the pulley 44 in response to steerage of the front road wheels FW1, FW2. The pulley 46 is integrally provided thereon with a pinion 47 which is in meshing engagement with a sub-rack bar 52 operatively connected to the lateral rack bar 11 by means of connecting rods 48 and 51. When the front road wheels FW1, FW2 are steered by axial displacement of the rack bar 11, the pulley 46 is rotated clockwisely or counterclockwisely, and in turn, the cam member 43 is rotated by the cables 45a, 45b to cause axial displacement of the drive rod 42. In this embodiment, the drive rod 42 will be retained in its neutral position even if the cam member 43 is rotated at a small angle from its neutral position. The valve spool 36b is connected to one end of a connecting rod 53 the other end of which is pivoted to an intermediate portion of lever 37 in such a manner as to be axially slidable thereon. The swingable lever 37 is pivoted at its rear end to the operation rod 31 in such a manner as to be slidable perpendicularly thereto and is eccentrically pivoted at its front end to a toothed wheel 54 which is rotatably mounted on the vehicle body structure and in meshing engagement with a worm gear 55 mounted on an output shaft of an electric step motor 56 for rotation therewith.

An electric control apparatus C for the rear wheel steering mechanism B includes a microcomputer 65 which is connected to a front wheel steering angle sensor 61, a vehicle speed sensor 62, a yaw-rate sensor 63 and a mode switch 64. The front wheel steering angle sensor 61 is mounted on the steering shaft 13 to produce an electric signal indicative of a steering angle $\theta f$ of the front road wheels FW1, FW2. The vehicle speed sensor 62 is arranged to detect a rotational speed of an output shaft of the power transmission (not shown) for producing an electric signal indicative of a travel speed of the vehicle. The yaw-rate sensor 63 is mounted on the vehicle body structure to detect a rotational speed about a vertical axis at the center of gravity of the vehicle body for producing an electric signal indicative of a yaw-rate $\omega y$ acting on the vehicle body. The mode switch 64 is arranged adjacent the driver's seat to be manipulated by the driver for selecting a normal mode or a sports mode as the steering mode of rear road wheels RW1, RW2. In this embodiment, the steering angle $\theta f$ is represented by a positive value when the front road wheels FW1, FW2 have been steered rightward and is represented by a negative value when the front road wheels FW1, FW2 have been steered leftward. The yaw-rate $\omega y$ is represented by a positive value in rightward turning of the vehicle and is represented by a negative value in leftward turning of the vehicle.

Figure 2:
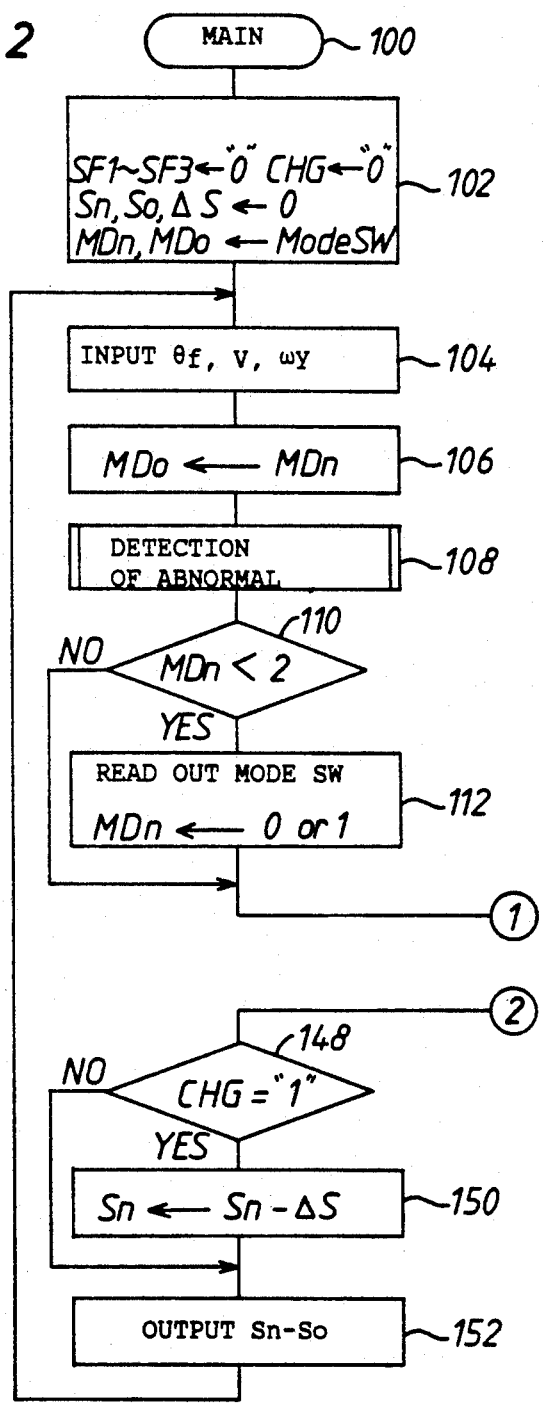
FIGS. 2 and 3 illustrate a main control program in the form of a flow chart to be executed by a microcomputer shown in FIG. 1.

The microcomputer 65 includes a read-only memory or ROM 65b, a central processing unit or CPU 65c, a random access memory or RAM 65d, a timer circuit 65e and an interface 65f which are connected in common to a bus line 65a. The ROM 65b is arranged to memorize a main control program shown by flow charts in FIGS. 2-4 and an interruption control program shown by a flow chart in FIG. 5 and to memorize first and second coefficients K1, K2 in form of first to sixth tables shown in FIGS. 6A to 6D. The CPU 65c is arranged to execute the main and interruption control programs, and the RAM 65d is arranged to temporarily memorize variables required for execution of the main control program. The timer circuit 65c is designed to produce an interruption signal at a predetermined time interval of, for instance, 100 ms, and the interface 65f is arranged to be applied with the electric signals from sensors 61-63 and mode switch 64 and to apply a control signal therefrom to the step motor 56.

Hereinafter, the operation of the electric control apparatus will be described with reference to FIGS. 2 to 5. Assuming that an ignition switch (not shown) of the vehicle has been closed, the CPU 56c is activated to initiate execution of the main control program at step 100 shown in FIG. 2. At the following step 102, the CPU 65c initializes sensor flags SF1-SF3, a change-mode flag CHG, new and old step numbers Sn, So and a difference $\Delta S$ between the step numbers Sn, So respectively as "0" and reads out a condition of the mode switch 64 to initialize new and old mode data MDn, MDo as a normal mode "0" or a sports mode "1". In this instance, the sensor flags SF1-SF3 represent each normal condition of the front wheel steering sensor 61, vehicle speed sensor 62 and yaw-rate sensor 63 when they have been set respectively as "0" and represent each abnormal condition of sensors 61, 62 and 63 when they have been set respectively as "1". The change-mode flag CHG is usually set as "0" to be set as "1" when the rear wheel steering mode has been changed. The new and old step numbers Sn, So represent following and preceding rotation amounts of step motor 56, respectively. The new and old mode data MDn, MDo represent following and preceding rear wheel steering modes.

Figure 5:
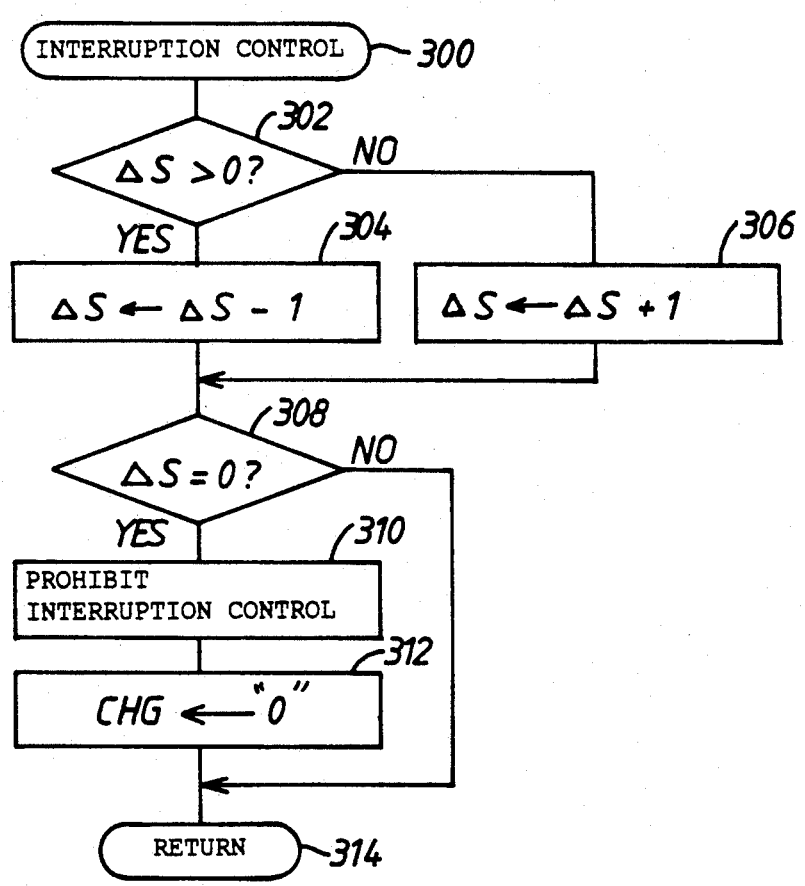
FIG. 5 is a flow chart illustrating an interruption control program to be executed by the microcomputer.
Figure 6A:
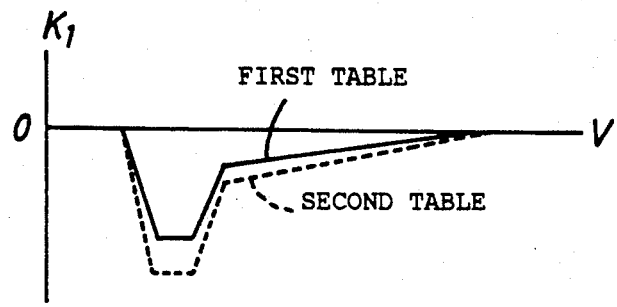
FIGS. 6A and 6D each are a graph showing a first coefficient in relation to the vehicle speed.
Figure 6B:
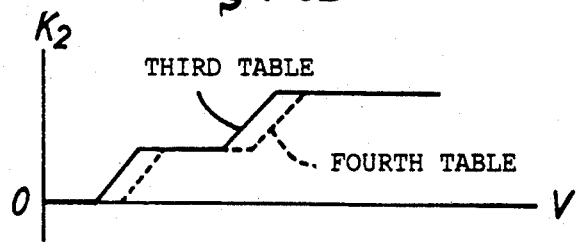
FIGS. 6B and 6C each are a graph showing a second coefficient in relation to the vehicle speed.
Figure 6C:
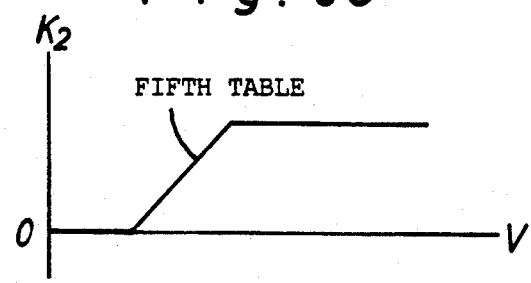
Figure 6D:
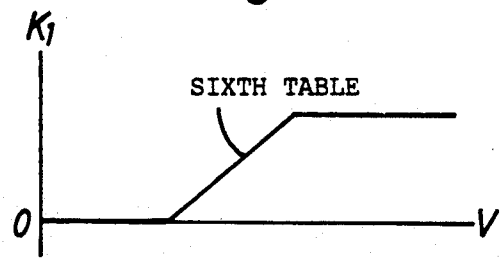

After initialization at step 102, the CPU 65c will repeat processings at the following steps and execute the interruption control program shown by the flow chart in FIG. 5 to control steerage of the rear road wheels RW1, RW2 in accordance with the conditions of mode switch 64 and sensors 61-63. Assuming that all the sensors 61-63 each are maintained in a normal condition, the CPU 65c reads out at step 104 a front wheel steering angle $\theta f$, a vehicle speed V and a yaw-rate $\omega y$ in response to the electric signals from sensors 61-63, sets at step 106 an old mode data MDo as a new mode data MDn and executes at step 108 a routine for detection of an abnormal condition. Since the sensors 61-63 each are maintained in a normal condition, the CPU 65c does not execute any substantive processing at step 108. After execution of the routine for detection of the abnormal condition at step 108, the CPU 65c determines at step 110 as to whether or not the new mode data MDn is less than "2". In this instance, the new and old mode data MDn, MDo are previously set as "0" or "1" at step 102 and 108. Thus, the CPU 65c determines a "YES" answer at step 110 and reads out a condition SW of mode switch 64 at step 112 to set it as a new mode data MDn. Assuming that the mode switch 64 is maintained in a normal mode, both the new and old mode data MDn, MDo are set as "0" by processing at step 102, 106 and 112.

Figure 3:
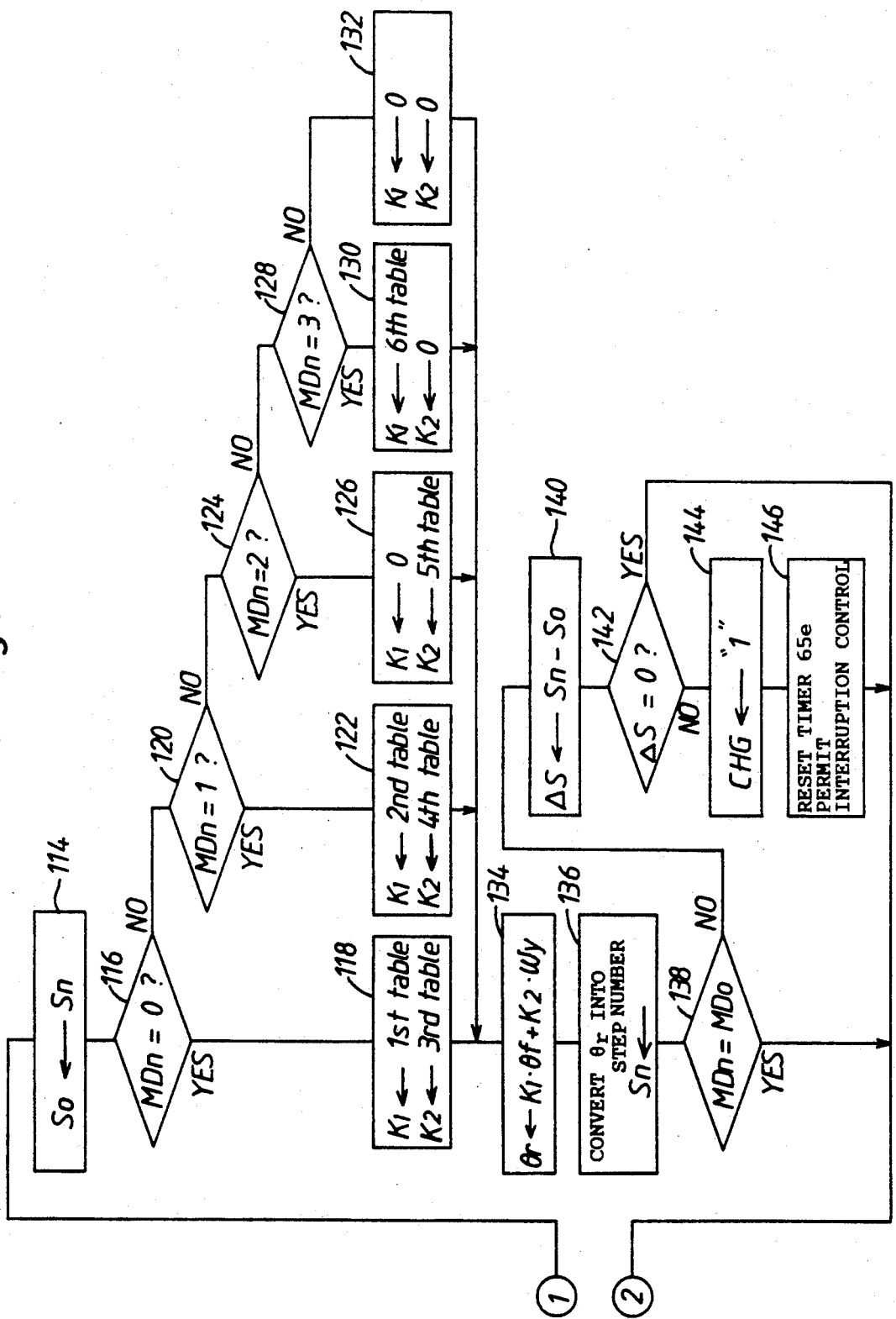

When the program proceeds to step 114 shown in FIG. 3, the CPU 65c renews the old step number So to the new step number Sn and determines at step 116 as to whether the new mode data MDn is "0" or not. Since the new mode data MDn is previously set as "0", the CPU 65c determines a "YES" answer at step 116 and causes the program to proceed to step 118. Thus, the CPU 65c determines first and second coefficients K1, K2 in relation to the vehicle speed V on a basis of the memorized first and third tables shown by solid lines in FIGS. 6A and 6B. In turn, the CPU 65c calculates a rear wheel steering angle $\theta r$ based on the following equation at step 134.

$$\theta r = K1 \cdot \theta f + K2 \cdot \omega y$$

Figure 7:
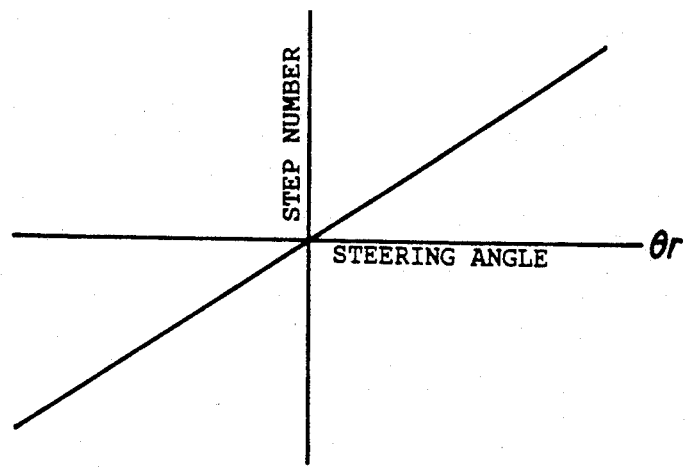
FIG. 7 is a graph showing a step number of a step motor in relation to a calculated rear wheel steering angle.

After processing at step 134, the CPU 65c converts the calculated rear wheel steering angle $\theta r$ into a step number for rotation of the step motor 56 and sets the converted step number as a new step number Sn. The step number relative to the calculated rear wheel steering angle $\theta r$ is shown in FIG. 7.

When the program proceeds to step 138, the CPU 65c determines as to whether the new mode data MDn is identical with the old mode data MDo or not. Since the new and old mode data MDn, MDo are previously set as "0" at step 102, 106, 112 and the change-mode flag CHG is also set as "0" at step 102, the CPU 65c determines a "YES" answer at step 138 and determines a "NO" answer at step 148 shown in FIG. 2. Thus, the program proceeds to step 152 where the CPU 65c substracts the old step number So from the new step number Sn and applies a control signal representing a resultant value of the subtraction to the step motor 56 through the interface 65f. In a condition where the vehicle speed V is detected by speed sensor 62 as "0" or a small value immediately after the ignition switch has been closed, both the first and second coefficients K1, K2 are set as "0" as shown by the solid lines in FIGS. 6A and 6B, and the rear wheel steering angle $\theta r$ and step numbers Sn, So are set as "0". In this instance, the CPU 65c does not produce any control signal representing a resultant value of the subtraction, and the step motor 56 is retained in a neutral position.

After processing at step 152, the CPU 65c will repeat the processing at step 104–118, 134–138, 148 and 152 for control of the step motor 56. Assuming that the vehicle has started, the vehicle speed V gradually increases from "0", and the first and second coefficients K1, K2 are set respectively as negative and positive values as shown by the solid lines in FIGS. 6A and 6B. In such a condition, the rear wheel steering angle $\theta r$ is calculated as a positive or negative value at step 134, and the new step number Sn for rotation of the step motor 56 is determined as a positive or negative value in relation to the rear wheel steering angle $\theta r$ as shown in FIG. 7. Thus, the old step number So is renewed as the new step number Sn at step 114, and the step motor 56 is rotated by a control signal indicative of the new step number Sn applied thereto at step 152. The rotation of step motor 56 causes the toothed wheel 54 to rotate clockwisely or counterclockwisely. As a result, the upper end of lever 37 is displaced leftward or rightward in accordance with the rotation amount of step motor 56 to cause axial movement of the valve spool 36b relative to the valve sleeve 36a. In this instance, the power cylinder 35 is supplied with the fluid under pressure from the tandem pump 18 in accordance with the axial movement of valve spool 36b to displace the operation rod 31 leftward or rightward, and in turn, the lever 37 cooperates with the valve spool 36b to eliminate the relative displacement of the valve spool 36b to the valve sleeve 36a in response to the axial displacement of operation rod 31. Thus, the rear road wheels RW1. RW2 are steered at the calculated steering angle $\theta r$.

Subsequently, the first and second coefficients K1, K2 are changed by processing at step 118 in accordance with the vehicle speed V, and the rear wheel steering angle $\theta r$ is calculated by processing at step 134 in accordance with the front steering angle $\theta f$ and yaw-rate $\omega y$. Thus, the rear road wheels RW1. RW2 are steered at the calculated steering angle $\theta r$ in accordance with the travel condition of the vehicle. During travel of the vehicle at a medium speed, the first coefficient K1 relative to the front wheel steering angle $\theta r$ is set as a negative value for a reverse phase control to facilitate initial turning maneuver of the vehicle. During travel of the vehicle at a high speed, the second coefficient K2 relative to the yaw-rate $\omega y$ is set as a positive value for a same phase control to stabilize travel of the vehicle.

Assuming that the mode switch 64 has been manipulated by the driver to switch over the steering mode of the rear road wheels from the normal mode to the sports mode, the new mode data MDn is set as "1" at step 112. As a result, the CPU 65c determines a "NO" answer at step 116 and a "YES" answer at step 120 and causes the program to proceed to step 122. Thus, the CPU 56c determines the first and second coefficients K1, K2 in relation to the vehicle speed V on a basis of the memorized second and fourth tables shown by dotted lines in FIGS. 6A and 6B. In turn, the CPU 65c calculates at step 134 and 136 a new step number Sn based on the first and second coefficients K1, K2, front wheel steering angle $\theta f$ and yaw rate $\omega y$ for control of the rear wheel steering mechanism B at the sports mode.

When the program proceeds to step 138, the CPU 65c determines as to whether the new mode data MDn is identical with the old mode data MDo or not. Since the new mode data MDn is previously set as "1" at step 112 and the old mode data MDo is maintained as "0", the CPU 65c determines a "NO" answer at step 138 and causes the program to proceed to step 140. Thus, the CPU 65c subtracts the old step number So from the new step number Sn at step 140 and determines at step 142 as to whether a difference $\Delta S$ between the new and old step numbers Sn, So is "0" or not. If the difference $\Delta S$ is "0", the CPU 65c determines a "YES" answer at step 142 and determines a "NO" answer at step 148 on a basis of the change-mode flag CHG previously set as "0". Thus, the program proceeds to step 152 where CPU 65c applies a control signal representing the difference S between step numbers Sn and So to the step motor 56 for controlling steerage of the rear road wheels at the sports mode. In such control at the sports mode, the first coefficient K1 relative to the front wheel steering angle $\theta f$ is set as a large negative value in comparison with that at the normal mode, and the second coefficient K2 relative to the yaw-rate ωy is set as a positive value at a higher travel speed than that at the normal mode. This is effective to cause sensitive response of the vehicle in operation of the steering wheel 14.

If the differences ΔS between step numbers Sn and So is not "0", the CPU 65c determines a "NO" answer at step 142 to execute processing at step 144 and 146. Thus, the change-mode flag CHG is set as "1" at step 144, and a counting value of timer circuit 65e is reset at step 146 to permit an interruption signal applied therefrom to the CPU 65c. After processing at step 144 and 146, the CPU 65c determines a "YES" answer at step 148 on a basis of the change-mode flag set as "1" at step 144 and causes the program to proceed to step 150. Thus, the CPU 65c subtracts the difference ΔS from the new step number Sn at step 150 to set a resultant value of the subtraction as a new step number Sn and produces a control signal indicative of the new step number Sn therefrom at step 152 for control of the step motor 56.

Figure 8A:
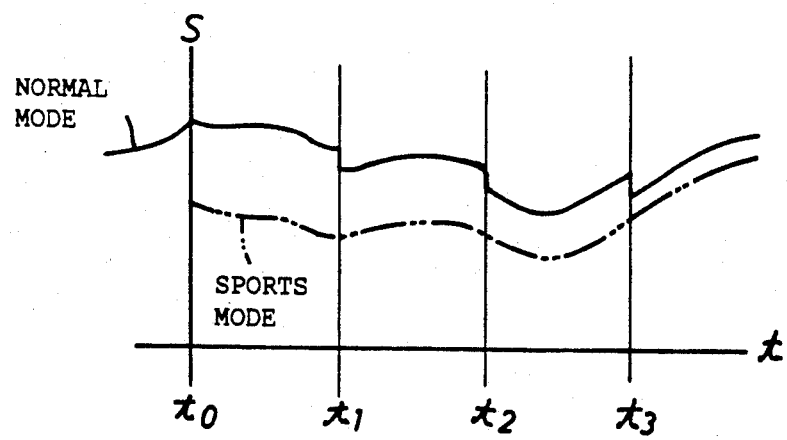
FIGS. 8A and 8B each are a time chart showing change of a rotation amount of the step motor.
Figure 8B:
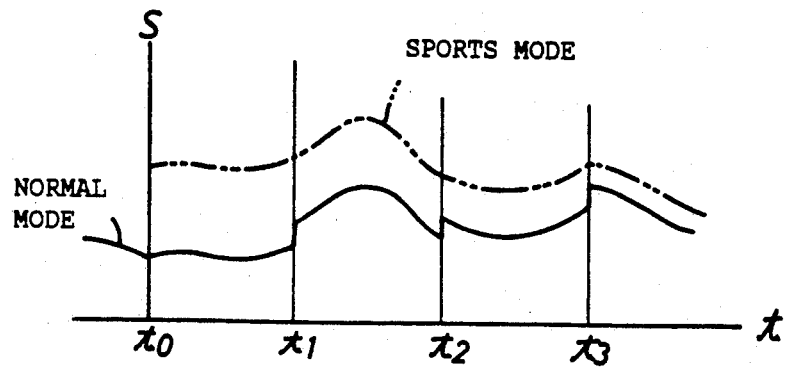

In FIG. 8B, the new step number Sn at the sports mode is shown by a chain line, while the old step number So at the normal mode is shown by a solid line. Assuming that the new step number Sn at the sports mode was larger than the old step number So at the normal mode at a time t0 when the steering mode of the rear road wheels had been changed to the sports mode from the normal mode, the difference ΔS between step numbers Sn, So is set as a positive value at step 140. Thus, the rotation amount of step motor 56 is defined at step 150 to be smaller than that defined by the new step number Sn. As a result, the rotation amount of step motor 56 at the time t0 is controlled to be substantially the same as that before change of the steering mode of the rear road wheels.

After processing at step 152, the program returns to step 104, and the old mode data MDo is renewed as the new mode data MDn at step 106. Thus, the CPU 65c determines a "YES" answer at step 138 and causes the program to proceed to step 148 without execution of the processing at steps 140-146. Since the change-mode flag CHG is previously set as "1" at step 144, the rotation amount of step motor 56 is defined by processing at steps 150 and 152 to be smaller than that defined by the new step number Sn at the sports mode. As a result, the steering angle of the rear road wheels RW1, RW2 is controlled by repetitive processing at steps 104-116, 120, 122, 134-138, 148-152 to be smaller than that defined by the new step number Sn.

Upon lapse of 100 ms from the time t0, the CPU 65c is applied with an interruption singal from the timer circuit 65e at a time t1 to execute the interruption program shown by the flow chart in FIG. 5. In this instance, the CPU 65c starts to execute the interruption program at step 300 and determines at step 302 as to whether the difference ΔS is positive or not. Since the difference ΔS is previously set as a positive value, the CPU 65c determines a "YES" answer at step 302 and renews the difference ΔS by subtraction of "1" at step 304. At the following step 308, the CPU 65c determines as to whether the renwed difference ΔS is "0" or not. If the answer is "NO", the CPU 65c will end the execution of the interruption program at step 314 and execute the main control program shown in FIGS. 2 and 3. Since the renewed difference ΔS is made smaller by subtraction of "1" at step 304, the rotation amount of step motor 56 approaches the new step number Sn as shown in FIG. 8B.

Upon further lapse of 100 ms from the time t1, the CPU 65c is applied with the interruption signal from the time circuit 65e at a time t2 to further execute the interruption program. In this instance, the CPU 65c determines a "YES" answer at step 302 and further subtracts "1" from the renwed difference S at step 304. When the main control program is subsequently executed after execution of the interruption program, the rotation amount of step motor 56 further approaches the new step number Sn as shown in FIG. 8B. When the difference ΔS becomes "0" by subtraction of "1" at step 304, the CPU 65c determines a "YES" answer at step 308, prohivits the interruption signal applied thereto from the timer circuit 65e at step 310 and sets the change-mode flag CHG as "0". Thus, the CPU 65c determines a "NO" answer at step 148 of the main control program and produces a control signal representing the new step number Sn for control fo the step motor 56 at step 152.

Assuming that the new step number Sn at the sports mode was smaller than the old step number So at the normal mode at a time t0 when the steering mode of the rear road wheels had been changed to the sports mode from the normal mode, the difference ΔS between step numbers Sn, So is set as a negative value at step 140. Thus, the rotation amount of step motor 56 is defined at step 150 to be larger than that defined by the new step number Sn. As a result, the rotation amount of step motor 56 at the time t0 is controlled to be substantially the same as that before change of the steering mode of the rear road wheels. (see FIG. 8A)

After processing at step 152, the program returns to step 104, and the old mode data MDo is renewed as the new mode data MDn at step 106. Thus, the CPU 65c determines a "YES" answer at step 138 and causes the program to proceed to step 148 without execution of the processing at steps 140-146. Since the change-mode flag CHG is previously set "1" at step 144, the rotation amount of step motor 56 is defined by processing at step 150 and 152 to be larger than that defined by the new step number Sn at the sports mode. As a result, the steering angle of the rear road wheels RW1, RW2 is controlled by repetitive processing at steps 104-116, 120, 122, 134-138, 148-152 to be larger than that defined by the new step number Sn.

Upon lapse of 100 ms from the time t0, the CPU 65c is applied with an interruption singal from the timer circuit 65e at a time t1 to execute the interruption program shown by the flow chart in FIG. 5. In this instance, the CPU 65c starts to execute the interruption program at step 300 and determines at step 302 as to whether the difference ΔS is positive or not. Since the difference ΔS is previously set as a negative value, the CPU 65c determines a "NO" answer at step 302 and renews the difference ΔS by addition of "1" at step 306. At the following step 308, the CPU 65c determines as to whether the renwed difference ΔS is "0" or not. If the answer is "NO", the CPU 65c will end the execution of the interruption program at step 314 and execute the main control program shown in FIGS. 2 and 3. Since the renewed difference ΔS is made larger by addition of "1" at the time interval of 100 ms, the rotation amount of step motor 56 approaches the new step number Sn as shown in FIG. 8A.

Upon further lapse of 100 ms from the time t1, the CPU 65c is applied with the interruption signal from the timer circuit 65e at a time t2 to further execute the interruption program. In this instance, the CPU 65c determines a "NO" answer at step 302 and further adds "1" to the renwed difference ΔS at step 306. When the main control program is subsequently executed after execution of the interruption program, the rotation amount of step motor 56 further approaches the new step number Sn as shown in FIG. 8A. When the difference ΔS becomes "0" by addition of "1" at step 306, the CPU 65c determines a "YES" answer at step 308, prohivits the interruption signal applied thereto from the timer circuit 65e at step 310 and sets the change-mode flag CHG as "0". thus, the CPU 65c determines a "NO" answer at step 148 of the main control program and produces a control signal representing the new step number Sn for control of the step motor 56 at step 152.

From the above description, it will be understood that an actual steering angle of the rear road wheels RW1, RW2 is gradually varied from the steering angle at the normal mode to the steering angle at the sports mode. In the course of such transition, the actual steering angle of the rear road wheels varies in accordance with decrease of the difference ΔS at the sports mode. When the mode switch 84 is switched over during travel of the vehicle at the sports mode to select the normal mode, steerage of the rear road wheels RW1, RW2 is controlled in a reverse manner to the above-described control. In such a case, the steering condition of the rear road wheels is gradually varied from the sports mode to the normal mode by processing at step 138-150 and execution of the interruption program.

Figure 4:
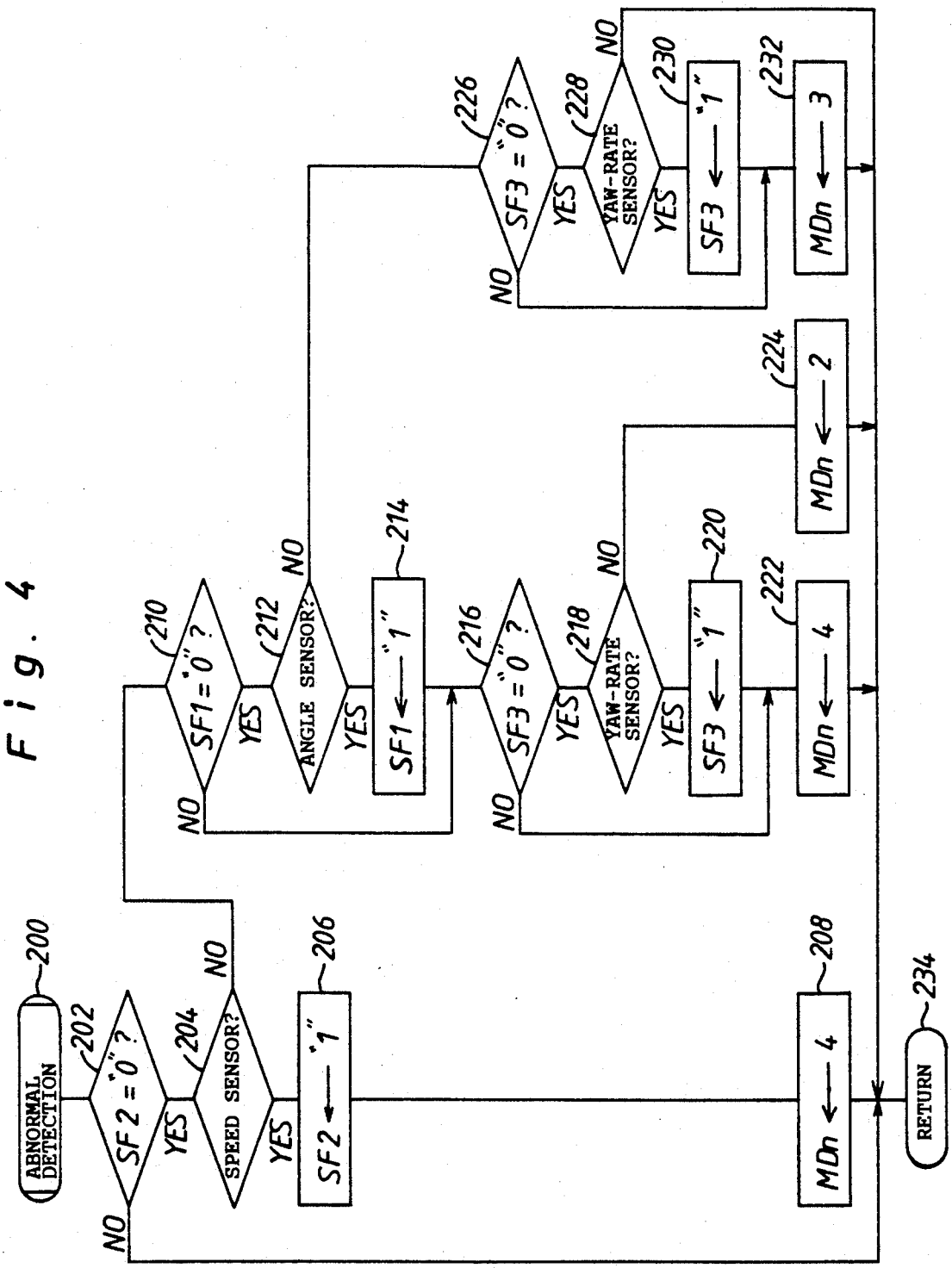
FIG. 4 is a flow chart illustrating an abnormal detection routine in the main control program.

In the case that the vehicle speed sensor 62 has been damaged, the CPU 65c executes at step 108 of the main control program the routine for detection of an abnormal condition shown in FIG. 4. In execution of the routine for detection of the abnormal condition, the CPU 65c determines a "YES" answer at step 202 on a basis of the sensor flag SF2 initially set as "0" and determines a "YES" answer at step 204 because of malfunction of the speed sensor 62. Subsequently, the CPU 65c sets the sensor flag SF2 as "1" at step 206 and sets the new mode data MDn as "4" at step 208. At the following step 234, the CPU 65c ends processing of the routine for detection of the abnormal condition. In this instance, the malfunction of speed sensor 62 is detected by the fact that an abnormal speed is detected or abnormal change of the vehicle speed is detected. After the malfunction of speed sensor 62 has been detected, the CPU 65c determines a "NO" answer at step 202 during execution of the routine for detection of the abnormal condition and causes at step 234 the program to proceed to step 110 of the main control program. Since the new mode data MDn is being set as "4", the CPU 65c determines a "NO" answer at step 110 and causes the program to proceed to step 114 shown in Fing 3. At step 114, the CPU 65c renews the old step number So as a new step number Sn and executes processing for mode detection at step 116, 120, 124 and 128 based on the new mode data MDn. In this instance, the CPU 65c determines a "NO" answer respectively at step 116, 120, 124 and 128 and sets at step 132 the first and second coefficients K1, K2 as "0". As a result, the CPU 65c sets the rear wheel steering angle θr as "0" at step 134 and sets the new step number Sn as "0" at step 136.

In such an abnormal condition as described above, the CPU 65c executes processing at step 138-152 of the main control program and the interruption control program shown in FIG. 5. Thus, the actual steering angle of rear road wheels RW1, RW2 prior to the malfunction of speed sensor 62 is gradually decreased to "0". During such control of the rear road wheels, the new mode data MDn is maintained as "4" because of no processing at step 112, and the steering angle of rear road wheels RW1, RW2 is maintained as "0" after decreased to "0".

Assuming that the front wheel steering angle sensor 61 has been damaged in a condition where the speed sensor 62 and yaw-rate sensor 63 are normal, the CPU 65c determines a "YES" answer at step 202 and a "NO" answer at step 204 and causes the program to proceed to step 210. Since the sensor flag SF1 is initially set as "0", the CPU 65c determines a "YES" answer at step 210 and determines a "YES" answer at step 212 because of malfunction of the steering angle sensor 61 and sets the sensor flag SF1 as "1" at step 214. In this instance, the malfunction of steering angle sensor 61 can be detected by the fact that an abnormal steering angle is detected or abnormal change of the steering angle is detected. After processing at step 214, the CPU 65c determines at step 216 a "YES" answer based on the sensor flag SF3 initially set as "0" and determines a "NO" answer at step 218 because of the normal condition of yawrate sensor 63. At the following step 224, the CPU 65c sets the new mode data MDn as "2" and ends execution of the routine for detection of the abnormal condition at step 234. After detection of the malfunction of steering angle sensor 61, the CPU 65c determines a "NO" answer at step 210 and ends execution of the routine for detection of the abnormal condition at step 234 after processing at step 216, 218, 224.

After execution of the abnormal detection routine, the CPU 65c executes processing at step 110, 114 and processing for mode detection at step 116, 120 and 124 based on the new mode data MDn. Since the new mode data MDn is previously set as "2" at step 224 of the routine for detection of the abnormal condition, the CPU 65c determines a "NO" answer respectively at step 116 and 120 and determines a "YES" answer at step 124. Thus, the program proceeds to step 126 where the CPU 65c sets the first coefficient K1 as "0" and sets the second coefficient K2 based on the fifth table shown in FIG. 6C. Subsequently, the CPU 65c sets a rear wheel steering angle θr as a value of K2·ωy at step 134 and converts the steering angle θr into a new step number Sn at step 136. Thus, the actual steering angle of rear road wheels RW1, RW2 prior to the malfunction of the sensor 61 is gradually varied to the value of K2·ωy by processing at step 138-152 of the main control program and execution of the interruption program. In this instance, the second coefficient K2 is varied from zero to a positive value during medium speed travel of the vehicle and is maintained as the positive value during high speed travel of the vehicle. As a result, the yaw-rate of the vehicle body is greatly restrained to enhance travel stability of the vehicle at a high speed. During such control of the rear road wheels, the new mode data MDn is maintained as "2" because of no processing at step 112, and the actual steering angle of rear road wheels RW1, RW2 is controlled in accordance with the value of K2·ωy.

Assuming that the yaw-rate sensor 63 has been damaged in a condition where the steering angle sensor 61 and speed sensor 62 each are maintained in a normal condition, the CPU 65c determines a "YES" answer at step 202, a "NO" answer at step 204, a "YES" answer at step 210 and a "NO" answer at step 212 and determines a "YES" answer at step 226 based on the sensor flag SF3 initially set as "0". Thus, the CPU 65c determines a "YES" answer at step 228 because of malfunction of the yaw-rate sensor 63 and sets the sensor flag SF3 as "1" at step 230. Subsequently, the CPU 65c sets the new mode data MDn as "3" at step 232 and ends execution of the routine for detection of the abnormal condition at step 234. After detection of the malfunction of yaw-rate sensor 63, the CPU 65c determines a "NO" answer at step 226 and ends execution of the routine for detection of the abnormal condition at step 234 after processing at step 232. After execution of the abnormal detection routine, the CPU 65c executes processing for detection of the new mode data MDn at step 116, 120, 124 and 128 after processing at step 110 and 114. Since the new mode data MDn is previously set as "3", the CPU 65c determines a "NO" answer respectively at step 116, 120, 124 and determines a "YES" answer at step 128. Thus, the program proceeds to step 130 where the CPU 65c sets the first coefficient K1 based on the sixth table shown in FIG. 6D and sets the second coefficient K2 as "0".

Subsequently, the CPU 65c sets a rear wheel steering angle $\theta r$ as a value of $K1 \cdot \theta f$ at step 134 and converts the steering angle $\theta r$ into a new step number Sn at step 136. Thus, the actual steering angle of rear road wheels RW1, RW2 prior to the malfunction of yaw-rate sensor 63 is gradually varied to the value of $K1 \cdot \theta f$ by processing at step 138-152 of the main control program and execution of the interruption control program. In this instance, the first coefficient K1 is varied from zero to a positive value during medium speed travel of the vehicle and is maintained as the positive value during high speed travel of the vehicle. As a result, the rear road wheels RW1, RW2 are steered in the same direction as the front road wheels FW1, FW2 during high speed travel of the vehicle to enhance travel stability of the vehicle. During such control of the rear road wheels, the new mode data MDn is maintained as "3" because of no processing at step 112, and the actual steering angle of rear road wheels RW1, RW2 is controlled in accordance with the value of $K1 \cdot \theta f$.

Assuming that both the steering angle sensor 61 and yaw-rate sensor 63 have been damaged in a condition where only the speed sensor 62 is normal, the CPU 65c determines a "YES" answer at step 202 and a "NO" answer at step 204. Subsequently, the CPU 65c sets the sensor flag SF1 as "1" by processing at step 210-214 and sets the sensor flag SF3 as "1" by processing at step 216-220. The CPU 65c further sets the new mode data MDn as "4" at step 222 and ends execution of the routine for detection of the abnormal condition at step 234. After detection of malfunction of the steering angle sensor 61 and yaw-rate sensor 63, the CPU 65c determines a "NO" answer respectively at step 210 and 216 and ends the abnormal detection routine at step 234 after processing at step 222. Subsequently, the CPU 65c executes processing for detection of the new mode data MDn at step 116, 120, 124 and 128 after processing at step 110 and 114. Since the new mode data MDn is previously set as "4", the CPU 65c sets at step 132 the first and second coefficients K1, K2 respectively as "0" and sets at step 134 the rear wheel steering angle $\theta r$ as "0".

In this embodiment, the electric control of the rear wheel steering mechanism B described above will be effected only when the front road wheels are steered at a small angle. During the electric control of the rear wheel steering mechanism B, the drive rod 42 and valve sleeve 36a are retained in their neutral positions even when the cam member 43 has been rotated at a small angle through cables 45a, 45b. When the front road wheels FW1, FW2 are steered at a large angle, axial displacement of the rack bar 11 causes the cam member 43 to rotate at a large angle. In this instance, the drive rod 42 is axially displaced in accordance with the rotation angle of cam member 43 to cause relative displacement between the valve sleeve 36a and valve spool 36b. Thus, the power cylinder 35 is supplied with the fluid under pressure from the tandem pump 18 under control of the spool valve 38 to displace the operation rod 31 thereby to steer the rear road wheels RW1, RW2. In this embodiment, the cam member 43 is formed to steer the rear road wheels RW1, RW2 in an opposite direction to the front road wheels FW1, FW2. This is useful to facilitate turning of the vehicle at a low speed.

Figure 9:
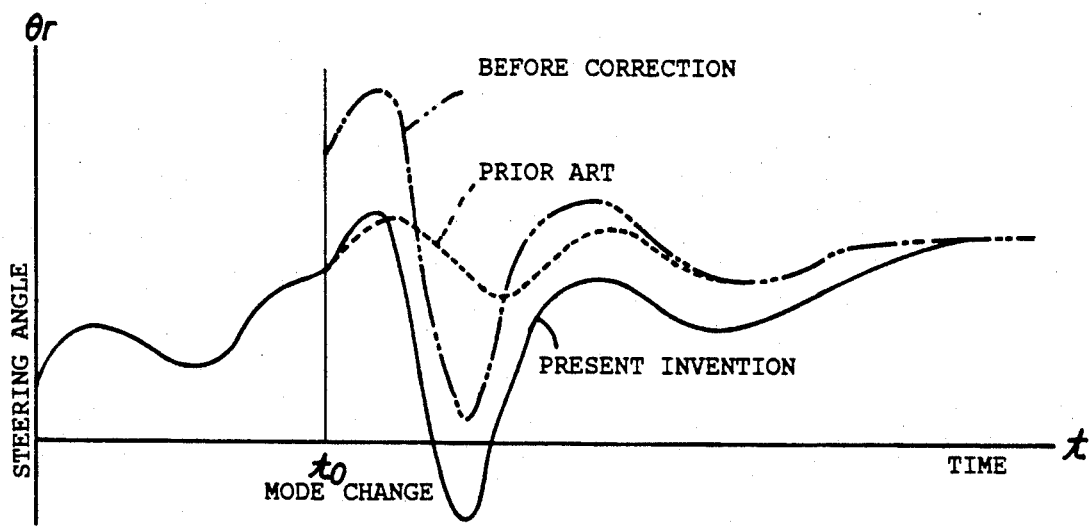
FIG. 9 is a time chart showing change of calculated and actual steering angles of the rear road wheels.

As is understood from the above description, a difference $\Delta S$ between the new and old step numbers Sn and So is calculated by processing at step 140 when the old mode data has been changed to and from the new mode data by manipulation of the mode switch 64 or abnormal conditions of the respective sensors 61-63. The difference $\Delta S$ is gradually varied toward zero by execution of the interruption control program, and the rotation amount of step motor 56 is controlled in accordance with a resultant value of $Sn - \Delta S$ by processing at step 148-152. As a result, the actual steering angle of rear road wheels RW1, RW2 is gradually varied from an old angle prior to change of the steering mode to a new angle after change of the steering mode as shown by a solid curve in FIG. 9. With such control as described above, the actual steering angle of the rear road wheels RW1, RW2 can be controlled without any sudden change when the steering mode has been changed. Even if the calculated steering angle of the rear road wheels suddenly changes after change of the steering mode as shown by a chain line in FIG. 9, the actual steering angle of the rear road wheels will correspond with the calculated steering angle as shown by the solid line in FIG. 9. This is effective to prevent the vehicle from unstable steering operation caused by change of the rear wheel steering mode and to eliminate the driver's incompatibility in his steering operation.

Although in the above embodiment, the rear wheel steering angle $\theta r$ has been set as "0" in an abnormal condition of the speed sensor 62, the second coefficient K2 may be set as a positive value when the yaw-rate sensor 63 is maintained in a normal condition thereby to steer the rear road wheels RW1, RW2 at an angle of $K2 \cdot \omega y$. In the above embodiment, an old step number Sn memorized in the RAM 65d has been adapted to an open loop for controlling the rotation amount of step motor 56. In the case that a sensor is provided to detect the rotation amount of step motor 56 or the actual steering angle of the rear road wheels, a closed loop using the sensor may be adapted to control the rotation amount of step motor 56.

What is claimed is:

1. An electric control apparatus for a four-wheel steering system in an automotive vehicle having a set of dirigible front road wheels and a set of dirigible rear road wheels, comprising:
   mode selection means for selecting any one of a plurality of rear wheel steering modes;
   memory means for memorizing a plurality of control rules respectively corresponding with the rear wheel steering modes;

calculation means for calculating a steering angle of the rear road wheels on a basis of the memorized control rule corresponding with the selected rear wheel steering mode; and an electrically operated rear wheel steering mechanism for steering the rear road wheels at the calculated steering angle;

wherein the electric control apparatus further comprises first means for calculating a difference between new and old steering angles respectively calculated by said calculation means when the selected rear wheel steering mode has been changed to another one of the rear wheel steering modes and immediately before change of the selected rear wheel steering mode; second means for gradually decreasing an absolute value of the calculated difference at a predetermined time interval; and third means for correcting the new steering angle in accordance with the absolute value of the calculated difference until the absolute value becomes zero after change of the selected rear wheel steering mode and for controlling an actual steering angle of the rear road wheels in accordance with the corrected new steering angle.

* * * * *